US008820142B2

(12) United States Patent
Rouveyre et al.

(10) Patent No.: US 8,820,142 B2
(45) Date of Patent: Sep. 2, 2014

(54) LEAK DETECTOR AND PROCESS CONTROL THEREFOR

(75) Inventors: Frédéric Rouveyre, Chavanod (FR); Didier Pierrejean, Groisy (FR); Cyrille Nomine, Epagny (FR)

(73) Assignee: Adixen Vacuum Products, Annecy (FR)

( * ) Notice: Subject to any disclaimer, the term of this patent is extended or adjusted under 35 U.S.C. 154(b) by 357 days.

(21) Appl. No.: 13/448,887

(22) Filed: Apr. 17, 2012

(65) Prior Publication Data
US 2012/0266659 A1 Oct. 25, 2012

(30) Foreign Application Priority Data

Apr. 21, 2011 (FR) ...................................... 11 01252

(51) Int. Cl.
*G01M 3/04* (2006.01)
*F04D 27/00* (2006.01)
*G01M 3/20* (2006.01)
*F04D 19/04* (2006.01)

(52) U.S. Cl.
CPC ............. *G01M 3/205* (2013.01); *F04D 27/008* (2013.01); *F04D 19/042* (2013.01)
USPC ............................................................ 73/40

(58) Field of Classification Search
CPC ........... G01M 3/02; G01M 3/04; G01M 3/20; G01M 3/202
USPC ........................................ 73/40, 40.5 R, 40.7
See application file for complete search history.

(56) References Cited

FOREIGN PATENT DOCUMENTS

| DE | 103 08 420 A1 | | 9/2004 | |
|----|---------------|---|--------|---|
| EP | 0 549 004 A1 | | 6/1993 | |
| EP | 0549004 | * | 6/1993 | .............. F04D 19/04 |
| EP | 1 767 790 A2 | | 3/2007 | |
| EP | 2 042 849 A1 | | 4/2009 | |

OTHER PUBLICATIONS

Preliminary Research Report in the French language for FR1101252 dated Dec. 7, 2011.
Written Opinion on Patentability in the French language for FR1101252 dated Apr. 21, 2011.

* cited by examiner

*Primary Examiner* — Hezron E Williams
*Assistant Examiner* — Nathaniel Kolb
(74) *Attorney, Agent, or Firm* — Daly, Crowley, Mofford & Durkee, LLP

(57) ABSTRACT

The invention relates to a method for monitoring a leak detector comprising: a secondary vacuum pump designed to be connected to a primary vacuum pump, the secondary vacuum pump comprising a motor, a rotor and a stator, the said rotor being capable of being rotated in the stator by the motor when the motor is powered, and at least one information means capable of being powered electrically, in order to inform a user of the operating state of the leak detector,
characterized in that, in the event of the motor power supply being cut off, the kinetic energy of rotation of the secondary vacuum pump rotor in the form of electrical power (101) is recovered in order to power the information means (102). The invention also relates to a leak detector (1) using the said monitoring method.

20 Claims, 2 Drawing Sheets

LEAK DETECTOR AND PROCESS CONTROL THEREFOR

CROSS REFERENCE TO RELATED APPLICATIONS

This application claims the benefit under 35 U.S.C. §119 of French application number FR1101252 filed on Apr. 21, 2011.

BACKGROUND OF THE INVENTION

The present invention relates to a method for monitoring a leak detector and an associated leak detector comprising a secondary vacuum pump having a rotor, such as a turbomolecular, molecular or hybrid vacuum pump. The invention applies more particularly to the leak detectors that are capable of being moved, such as portable leak detectors, on wheels or able to be moved by trolley.

In operation, the rotor of a secondary vacuum pump rotates at a very high rotation speed, such as several thousand revolutions per minute, in order to establish a high vacuum or ultra-high vacuum. Because of the very high rotation speed and of the inertia of the rotor, the user must wait a certain time after having commanded the stopping of the secondary vacuum pump for the stopping of the rotor to be effective and for him to be able to move the leak detector without risking damaging it. Specifically, a hasty movement may cause the secondary vacuum pump to seize because of the gyroscopic effect. The movement of the leak detector generates thrust forces that can deflect the rotation axis of the rotor and cause it to seize. This risk exists even for slight movements.

In order to limit this risk, the manufacturers recommend waiting several minutes after the command to stop the vacuum pump before moving the leak detector. The recommended waiting times depend on the type of secondary vacuum pump and on the rotation speed of the rotor at the time of the stop command. They are usually between five and ten minutes. It is found however that, during use, certain users do not comply with these waiting times. This failing is mainly due to the fact that the recommended time is not the same for all the leak detectors. It is therefore not necessarily known by the user at the appropriate moment. Other effects also lead to a failure to comply with these waiting times, for example when the user has incorrectly estimated the waiting time that has elapsed or else if he has forgotten the manufacturers' recommendation.

This problem is common to all the leak detectors that are capable of being moved and that comprise a secondary vacuum pump that has a rotor.

SUMMARY OF THE INVENTION

One of the objects of the present invention is to propose a monitoring method and a leak detector that are enhanced so as to reduce the risks of seizing by an overhasty movement of the leak detector after it has been stopped.

Accordingly, the subject of the invention is a method for monitoring a leak detector comprising:
- a secondary vacuum pump designed to be connected to a primary vacuum pump, the secondary vacuum pump comprising a motor, a rotor and a stator, the said rotor being capable of being rotated in the stator by the motor when the motor is powered, and
- at least one information means capable of being powered electrically, in order to inform a user of the operating state of the leak detector characterized in that, in the event of the motor power supply being cut off, the kinetic energy of rotation of the secondary vacuum pump rotor is recovered in the form of electrical power in order to power the information means.

According to one or more features of the monitoring method, taken singly or in combination:
- the kinetic energy of rotation of the rotor is recovered by means of the motor,
- an alarm message is displayed on a screen of the information means when the screen is powered by the recovered energy,
- the recovered energy is used to power a means of returning the primary vacuum pump to atmospheric pressure and to re-establish atmospheric pressure at the inlet of the primary vacuum pump.

A further subject of the invention is a leak detector comprising:
- a secondary vacuum pump designed to be connected to a primary vacuum pump, the secondary vacuum pump comprising a motor, a rotor and a stator, the said rotor being capable of being rotated in the stator by the motor when the motor is powered, and
- at least one information means capable of being electrically powered, to inform a user of the operating state of the leak detector, characterized in that the leak detector also comprises an energy-recovery means that can recover the kinetic energy of rotation of the secondary vacuum pump rotor in the form of electrical energy to power the information means.

According to one or more features of the leak detector, taken singly or in combination:
- the energy recovery means is configured to recover the energy generated by the motor of the secondary vacuum pump,
- the leak detector comprises an electronic control means comprising:
  - a supervision board connected to a power supply means,
  - a speed variator board driven by the supervision board for commanding the rotation speed of the motor of the secondary vacuum pump, the speed variator board comprising a reversible electronic power converter the input of which is connected to the power supply means of the supervision board, the supervision board also being configured to drive the speed variator board to recover the energy generated by the motor,
- the supervision board is configured to power a screen of the information means and display an alarm message on the screen when the supervision board is powered by the recovered energy,
- the leak detector comprises a primary vacuum pump and a means for returning the primary vacuum pump to atmospheric pressure and the supervision board is also configured to control the opening of an electromagnetic valve of the means for returning to atmospheric pressure when the supervision board is powered by the recovered energy.

Thus, when the user commands the stopping of the leak detector, the motor of the secondary vacuum pump is no longer powered. The accumulated kinetic energy and the inertia mean that the rotor nevertheless continues to rotate. The electric motor then mechanically driven operates like a generator and supplies electrical energy from the mechanical energy in order to power the information means of the leak detector.

The decrease in the rotational speed of the rotor causes the drop in the recovered energy until the latter no longer makes it possible to sufficiently power the information means. When the information means is no longer powered, the user knows that the secondary vacuum pump is stopped or is rotating sufficiently slowly to be able to be moved without risk.

It is therefore no longer necessary for the user to know precisely the waiting time recommended by the manufacturer. The drop in the power supply of the information means indicates the end of the waiting time irrespective of the type of secondary vacuum pump or of the rotational speed at the time of the stop command.

BRIEF DESCRIPTION OF THE DRAWINGS

Other features and advantages of the invention will emerge from the following description given as an example, which is non-limiting, with respect to the appended drawings in which.

In these figures, identical elements bear the same reference numbers.

DETAILED DESCRIPTION OF THE PREFERRED EMBODIMENTS

Figure 1:
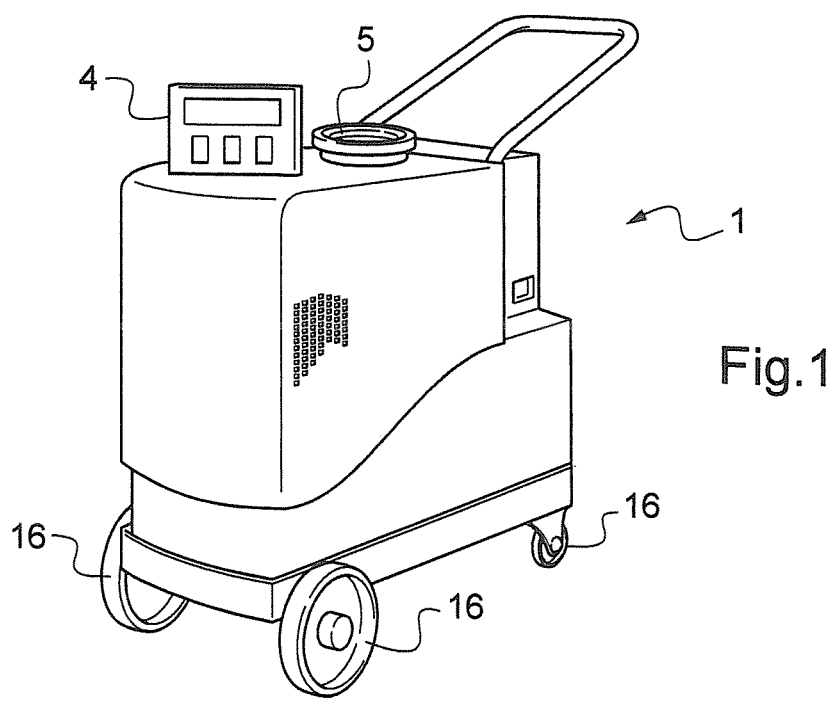
FIG. 1 shows a view in perspective of an example of a leak detector.
Figure 2:
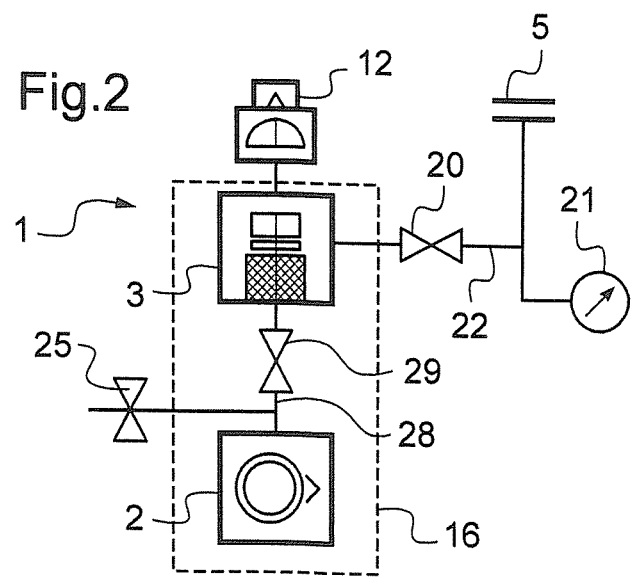
FIG. 2 shows a schematic view of elements of the leak detector of FIG. 1.
Figure 5:
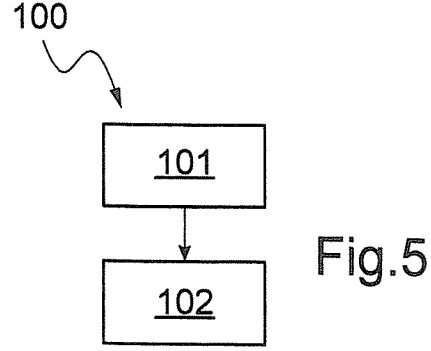
FIG. 5 represents a flow chart of the steps of a method for monitoring the leak detector of FIG. 1.

FIGS. 1 and 2 represent an example of a leak detector 1.

The leak detector 1 comprises a primary vacuum pump 2, a secondary vacuum pump 3 connected to the primary vacuum pump 2, a mass spectrometer 12 connected to the suction side of the secondary vacuum pump 3 and at least one information means 4 for informing a user of the operating state of the leak detector 1.

The secondary vacuum pump 3 comprises a rotor, a stator and a motor. The rotor is rotated in the stator by the motor when the motor is powered. FIG. 1 shows the gas inlet 5 of the leak detector 1.

The discharge side of the secondary vacuum pump 3 is connected to the suction side of the primary vacuum pump 2 by means of a pumping pipe 28 provided with a first isolation electromagnetic valve 29 of the leak detector 1.

According to another example not shown, the leak detector comprises no primary vacuum pump: the outlet of the secondary vacuum pump 2 is designed to be connected to a pumping pipe capable of supplying a primary vacuum pressure.

The secondary vacuum pump 3 is for example a small turbomolecular or hybrid vacuum pump, with a pumping capacity of between 5 and 40 l/s. The primary vacuum pump 2 is for example a small oil sealed rotary vane.

The information means 4 is capable of being electrically powered. It comprises for example a control panel having a display screen and/or an audible warning signal and/or an indicator lamp. The control panel may also comprise an input keyboard. The control panel makes it possible for example to start and stop the leak detector 1. Alternatively, the leak detector 1 may comprise a main power supply switch. The information means 4 informs for example the user of the rotation speed of the secondary vacuum pump 3.

The inlet 5 of the leak detector 1 is suitable for being connected to an enclosure the seal of which is to be verified. The inlet 5 communicates with the inlet of the secondary vacuum pump 3 by means of a second isolation electromagnetic valve 20.

The leak detector 1 may also comprise a pressure sensor 21 in order to determine the gas pressure in the connecting pipe 22 of the leak detector 1, connecting the secondary vacuum pump 3, upstream of the second isolation electromagnetic valve 20.

The leak detector 1 has a limited bulk and a low weight (less than 30 kg). It is therefore portable or can be transported with a trolley. In the example shown, the leak detector 1 therefore has four wheels 16 three of which can be seen in FIG. 1. The leak detector 1 can therefore be easily moved in the location where leaks are being sought.

In operation, the partial helium pressure contained in the residual atmosphere of an enclosure connected to the inlet 5 of the leak detector 1 is for example measured. The gas contained in the enclosure is sucked through the inlet 5 of the secondary vacuum pump 3 and is discharged into the primary vacuum pump 2. A portion of the gas to be analysed, possibly containing the tracer gas that reveals a leak, is then sampled by the mass spectrometer 12.

The leak detector 1 also comprises an energy-recovery means that can recover the kinetic energy of rotation of the rotor of the secondary vacuum pump 3 in the form of electrical energy and provides it for powering the information means 4.

Figure 3:
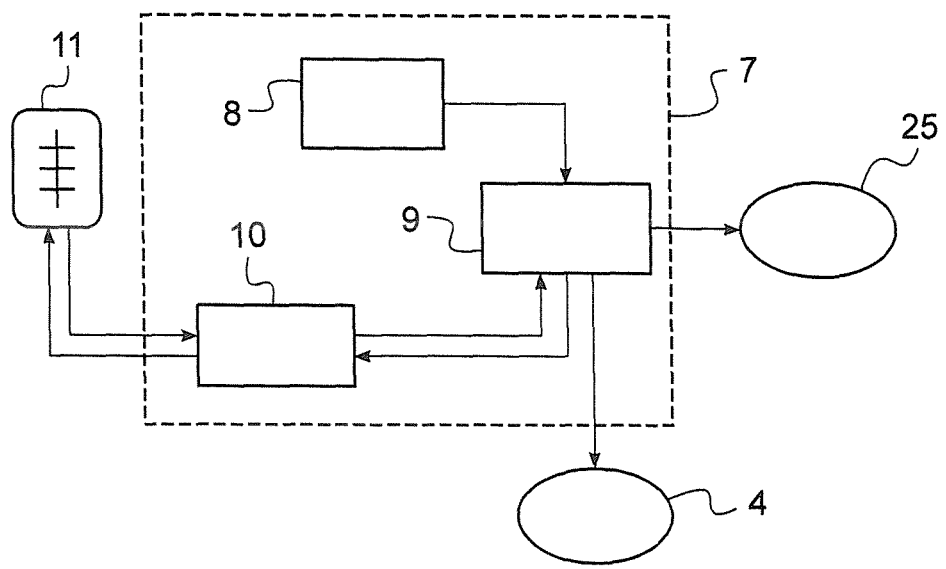
FIG. 3 represents a schematic view of the electrical wiring of elements of the leak detector of FIG. 1.
Figure 4:
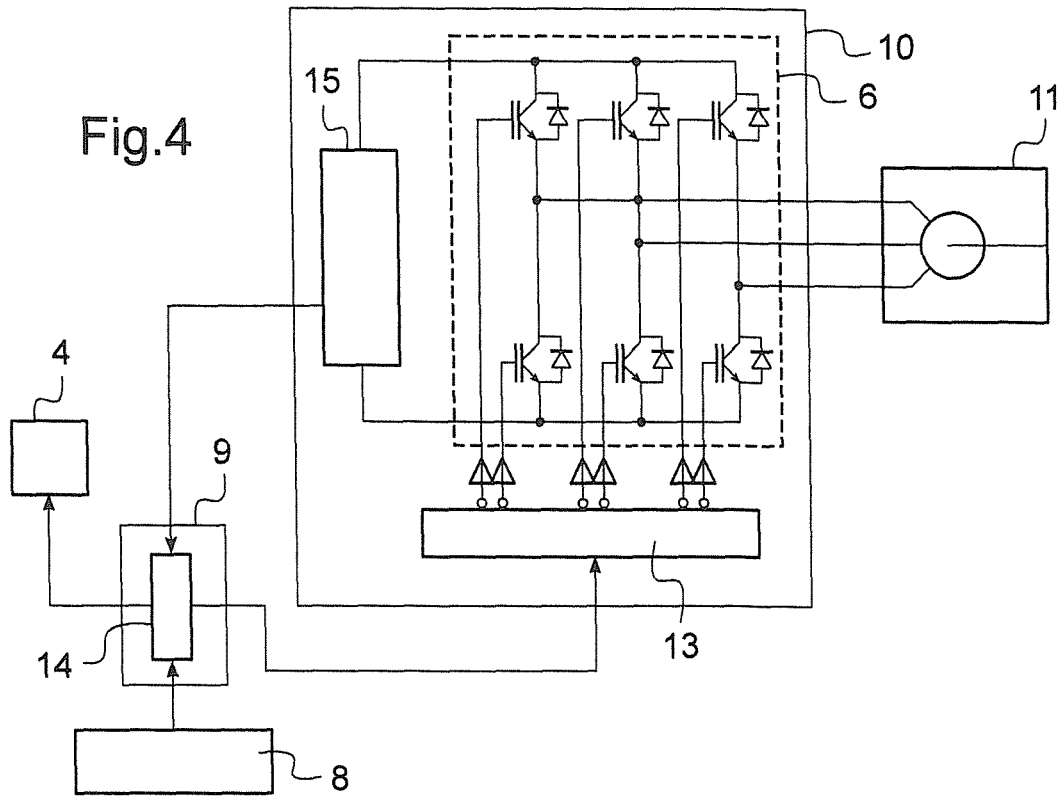
FIG. 4 represents a schematic view in greater detail of the wiring of FIG. 3.

According to one exemplary embodiment shown in FIGS. 3 and 4, the leak detector 1 comprises an electronic control means 7 comprising:
a power supply board 8 forming a power supply means for example capable of delivering a DC voltage of 24 V,
a supervision board 9 (or mother board) connected to the power supply board 8,
a speed variator board 10 driven by the supervision board 9 for commanding the rotational speed of the motor 11 of the secondary vacuum pump 3.

The driving of the motor 11 of the secondary vacuum pump 3 is, for one example, an electrical current driving. The supervision board 9 is also configured to drive other functions of the secondary vacuum pump 3 and for managing the power supply of the gas analysis cell of the spectrometer 12, in order to drive the first and second isolation electromagnetic valves 29 and 20, and in order to communicate with a user interface of the leak detector 1, such as a remote control unit or a control panel of the information means 4.

The energy-recovery means is for example configured to recover the kinetic energy generated by the rotation of the rotor by means of the motor 11 of the secondary vacuum pump 3.

More easily visible in the exemplary embodiment of the energy-recovery means illustrated in FIG. 4, the speed variator board 10 comprises a control unit 13, such as a microprocessor and a reversible electronic power converter 6, such as a reversible inverter of voltage (or of current) or DC converter.

The output of the reversible inverter 6 is connected to the phases of the electric motor 11 of the secondary vacuum pump 3. The input of the reversible inverter 6 is connected to the power supply 14 of the supervision board 9.

According to the example shown, the electric motor 11 is a three-phase motor and the reversible inverter 6 comprises a circuit of three branches coupled in parallel. Each branch comprises a coupling in series of two assemblies each comprising a switch driven by the control unit 13. Each switch comprises for example a diode and a power transistor coupled in parallel. The two diodes are mounted in the same on-state direction.

According to another exemplary embodiment not shown, the electric motor 11 is a two-phase motor and the reversible inverter 6 comprises a circuit of two branches coupled in parallel.

The speed variator board 10 may also comprise a reserve of energy taking the form of a capacitor which limits the speed of voltage drop.

Moreover, the supervision board 9 is configured to control the speed variator board 10 which commands the switches of the reversible inverter 6 in order to recover the energy generated by the motor 11 when it is rotated by the rotor.

The speed variator board 10 may also comprise a direct current-direct current (DC/DC) voltage converter 15. The voltage converter 15 is connected between the input of the reversible inverter 6 and the power supply 14 of the supervision board 9. It makes it possible to convert the DC voltage recovered from the motor of the order of 90 V into a voltage compatible with the power supply 14 of the electromagnetic board 9 of the order of 24 V. Equally, for safety reasons, the speed variator board 10 may comprise galvanic isolation means in order to isolate the zone under 90 V voltage from the zone under 24 V voltage (not shown). Alternatively, an electric motor powered directly at 24 V is used.

Thus, when the leak detector 1 is powered, the power supply board 8 powers the supervision board 9 which drives the speed variator board 10 so as to power the motor 11 which in its turn rotates the rotor of the secondary vacuum pump 3.

Then, when the user commands the stopping of the leak detector 1, the power supply board 8, and hence the power supply of the motor, is switched off. The accumulated kinetic energy and the inertia mean that the rotor nevertheless continues to rotate. The electric motor 11 is then mechanically rotated by the rotor, operating like a current generator and electrically powering the output of the reversible inverter 6.

The speed variator board 10 controls the reversible inverter 6 in order to recover this electric energy and re-power the supervision board 9 instead of the power supply board 8 (step 101 of the method for monitoring the leak detector 100).

More specifically, the control unit 13 of the speed variator board 10 monitors the voltage at the terminals of the motor 11. If this voltage drops, the control unit 13 commands the power transistors to raise the voltage to a sufficient value to regenerate it to an exploitable voltage. Then, the wide-input range DC/DC voltage converter 15 transforms the voltage originating from the motor from 90 V to a stable 24 V DC.

As long as the secondary vacuum pump 3 rotates at a speed higher than a speed threshold (for example 10 000 revolutions per minute), the intensity supplied by the rotation of the motor is recovered through the speed variator board 10 which transmits this intensity to the supervision board 9 thus kept powered and hence operating.

The supervision board 9 is for example configured to power a screen of the information means 4 and display an alarm message on the screen when the supervision board 9 is powered by the recovered energy (step 102). The alarm message for example tells the user not to move the leak detector 1.

With the decrease in the rotational speed of the rotor, a drop in the recovered energy is observed until the latter is no longer sufficient to supply the supervision board 9. The result of this is that the message is no longer maintained on the control panel. The user can then move the leak detector 1 in total safety.

It is therefore no longer necessary for the user to know precisely the waiting time recommended by the manufacturer. It is the drop in the supply power of the information means 4 that indicates the end of the waiting time irrespective of the type of secondary vacuum pump 3 or of the rotation speed at the time of the stop command.

Moreover, in this example, in addition to the use of the recovered energy to power the information means, it is also possible to use the recovered energy to control the return to atmospheric pressure of the primary vacuum pump 2 when the motor is no longer powered.

For this, the leak detector 1 comprises a means for returning to atmospheric pressure comprising an electromagnetic valve 25 connected to the pumping pipe 28 of the leak detector 1 between the primary vacuum pump 2 and the secondary vacuum pump 3. In addition, the supervision board 9 is configured to control the opening of the electromagnetic valve 25 when the supervision board 9 is powered with the recovered energy (FIG. 3).

Thus, the kinetic energy is recovered in the form of electric energy and is converted to supply the supervision board 9 which powers the information means 4 and commands the opening of the electromagnetic valve 25.

The electromagnetic valve 25 therefore allows the introduction of gas, such as the air of the surrounding atmosphere, into the pumping pipe 28 when the secondary vacuum pump 3 is stopped, until the primary vacuum pump 2 is returned to atmospheric pressure although the power supply of the leak detector 1 is cut off. This prevents oil from feeding back into the pumping pipe.

It is also possible to use the recovered energy to power other components of the leak detector 1 when the motor is no longer powered, such as light-emitting diodes or electronic circuit boards.

The accumulated kinetic energy thus recovered and used to power the information means of the leak detector thus tells the user when he can move the leak detector without risk. It is therefore no longer necessary for the user to know precisely the waiting time recommended by the manufacturer. The leak detector therefore makes it possible to reduce the risks of seizing caused by an overhasty movement of the leak detector after it has stopped.

The invention claimed is:

1. A method for monitoring a leak detector comprising:
   a secondary vacuum pump designed to be connected to a primary vacuum pump, the secondary vacuum pump comprising a motor, a rotor and a stator, the said rotor being capable of being rotated in the stator by the motor when the motor is powered, and
   at least one information means capable of being powered electrically, in order to inform a user of the operating state of the leak detector,
   characterized in that, in the event of the motor power supply being cut off, the kinetic energy of rotation of the secondary vacuum pump rotor is recovered in the form of electrical power in order to power the information means.

2. The method according to claim 1, characterized in that the kinetic energy of rotation of the rotor is recovered by means of the motor.

3. The method according to claim 1, characterized in that an alarm message is displayed on a screen of the information means when the screen is powered by the recovered energy.

4. The method according to claim 1, for a leak detector comprising a primary vacuum pump, characterized in that the recovered energy is used to power a means of returning the primary vacuum pump to atmospheric pressure and to re-establish atmospheric pressure at the inlet of the primary vacuum pump.

5. A leak detector comprising:
a secondary vacuum pump designed to be connected to a primary vacuum pump, the secondary vacuum pump comprising a motor, a rotor and a stator, the said rotor being capable of being rotated in the stator by the motor when the motor is powered, and
at least one information means capable of being electrically powered, to inform a user of the operating state of the leak detector,
characterized in that the leak detector also comprises an energy-recovery means that can recover the kinetic energy of rotation of the secondary vacuum pump rotor in the form of electrical energy to power the information means.

6. The detector according to claim 5, characterized in that the energy recovery means is configured to recover the energy generated by the motor of the secondary vacuum pump.

7. The detector according to claim 6, characterized in that it comprises an electronic control means comprising:
a supervision board connected to a power supply means,
a speed variator board driven by the supervision board for commanding the rotation speed of the motor of the secondary vacuum pump, the speed variator board comprising a reversible electronic power converter the input of which is connected to the power supply means of the supervision board, the supervision board also being configured to drive the speed variator board to recover the energy generated by the motor.

8. The detector according to claim 7, characterized in that the supervision board is configured to power a screen of the information means and display an alarm message on the screen when the supervision board is powered by the recovered energy.

9. The detector according to claim 7, comprising a primary vacuum pump, characterized in that the leak detector comprises a means for returning the primary vacuum pump to atmospheric pressure and in that the supervision board is also configured to control the opening of an electromagnetic valve of the means for returning to atmospheric pressure when the supervision board is powered by the recovered energy.

10. A method for monitoring a leak detector having a motor power supply, a primary vacuum pump, a secondary vacuum pump operably coupled to the primary vacuum pump and at least one electrically powered information means, the method comprising:
(a) powering the primary and secondary vacuum pumps with the motor power supply; and
(b) in response to the motor power supply being cut off:
(1) generating electrical power via the secondary vacuum pump; and
(2) providing electrical power from the secondary vacuum pump to at least one of the at least one electrically powered information means.

11. The method of claim 10 wherein the secondary vacuum pump includes a motor having a rotor and a stator and wherein generating electrical power via the secondary vacuum pump comprises using kinetic energy of rotation of the secondary vacuum pump rotor to generate the electrical power.

12. The method of claim 11 wherein using kinetic energy of rotation of the secondary vacuum pump rotor to generate the electrical power comprises using rotation of the rotor in the secondary vacuum pump rotor to generate electrical power.

13. The method according to claim 12, characterized in that the kinetic energy of rotation of the rotor is recovered by means of the motor.

14. The method according to claim 10 further comprising displaying an alarm message on a screen of the information means when the screen is powered by electrical power from the secondary vacuum pump.

15. The method according to claim 10 further comprising using the electrical power from the secondary vacuum pump to power a means of returning the primary vacuum pump to atmospheric pressure and to re-establish atmospheric pressure at the inlet of the primary vacuum pump.

16. A leak detector comprising:
a primary vacuum pump;
a secondary vacuum pump coupled to the primary vacuum pump, the secondary vacuum pump comprising a motor, a rotor and a stator, with the rotor being capable of being rotated in the stator by the motor when the motor is powered, and
at least one information means capable of being electrically powered, to inform a user of the operating state of the leak detector,
an energy-recovery means configured to recover kinetic energy of rotation of the secondary vacuum pump rotor in the form of electrical energy and configured to power the information means.

17. The detector according to claim 16, wherein said energy recovery means is configured to recover the energy generated by the motor of the secondary vacuum pump.

18. The detector according to claim 16, further comprising an electronic control means comprising:
a supervision board connected to a power supply means,
a speed variator board driven by the supervision board for commanding the rotation speed of the motor of the secondary vacuum pump, the speed variator board comprising a reversible electronic power converter the input of which is connected to the power supply means of the supervision board, the supervision board also being configured to drive the speed variator board to recover the energy generated by the motor.

19. The detector according to claim 18, wherein the supervision board is configured to power a screen of the information means and display an alarm message on the screen when the supervision board is powered by the recovered energy.

20. The detector according to claim 19, further comprising:
means for returning the primary vacuum pump to atmospheric pressure, said means comprising an electromagnetic valve; and
wherein said supervision board is also configured to control an opening of the electromagnetic valve of the means for returning to atmospheric pressure when the supervision board is powered by the recovered energy.

* * * * *